(12) United States Patent
Valeri et al.

(10) Patent No.: US 11,142,172 B2
(45) Date of Patent: Oct. 12, 2021

(54) VEHICLE BRAKING TYPE INDICATION SYSTEMS AND METHODS

(71) Applicant: GM GLOBAL TECHNOLOGY OPERATIONS LLC, Detroit, MI (US)

(72) Inventors: Frank C. Valeri, Novi, MI (US); Glenn Pietila, Howell, MI (US); Timothy R. Bohn, Dexter, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 323 days.

(21) Appl. No.: 16/403,781

(22) Filed: May 6, 2019

(65) Prior Publication Data
US 2020/0353903 A1 Nov. 12, 2020

(51) Int. Cl.
*B60T 7/04* (2006.01)
*B60T 17/22* (2006.01)
*B60W 50/16* (2020.01)
*B60W 30/18* (2012.01)

(52) U.S. Cl.
CPC .............. *B60T 7/042* (2013.01); *B60T 17/22* (2013.01); *B60W 30/18127* (2013.01); *B60W 50/16* (2013.01); *B60L 2210/40* (2013.01); *B60T 2220/04* (2013.01); *B60T 2270/60* (2013.01)

(58) Field of Classification Search
CPC ....................................................... B60T 7/042
See application file for complete search history.

(56) References Cited

U.S. PATENT DOCUMENTS

| | | | |
|---|---|---|---|
| 9,227,561 B2* | 1/2016 | Burgdorf | B60T 7/04 |
| 9,944,198 B2* | 4/2018 | O'Meachair | B60L 15/2009 |
| 10,246,095 B2* | 4/2019 | Lee | B60W 30/18145 |
| 2008/0023274 A1* | 1/2008 | Sakamoto | B60T 7/04 188/31 |
| 2019/0106103 A1* | 4/2019 | Inoue | B60W 50/16 |
| 2019/0176794 A1* | 6/2019 | Pinto, IV | B60T 17/22 |
| 2019/0283779 A1* | 9/2019 | Sohoni | B60W 40/09 |
| 2020/0353903 A1* | 11/2020 | Valeri | B60W 30/18127 |

FOREIGN PATENT DOCUMENTS

| | | |
|---|---|---|
| WO | WO-2006/030536 A1 | 3/2006 |
| WO | WO-2012/152797 A1 | 11/2012 |
| WO | WO-2014/069527 A1 | 5/2014 |

* cited by examiner

*Primary Examiner* — Michael A Berns
(74) *Attorney, Agent, or Firm* — Harness, Dickey & Pierce, P.L.C.

(57) ABSTRACT

A brake pedal portion is configured to be contacted by a driver; an arm portion is connected to the brake portion and is configured to, in response to force being applied to the brake pedal portion, move in a first direction away from a first predetermined position and toward a second predetermined position; a detent mechanism is configured to: apply a first biasing force to the arm portion in a second direction that is opposite to the first direction when a position of the arm portion is between the first predetermined position and a third predetermined position between the first and second predetermined positions; and apply a second biasing force to the arm portion in the second direction opposite to the first direction when the position of the arm portion is between the third and second predetermined positions, where the first biasing force is different than the second biasing force.

19 Claims, 4 Drawing Sheets

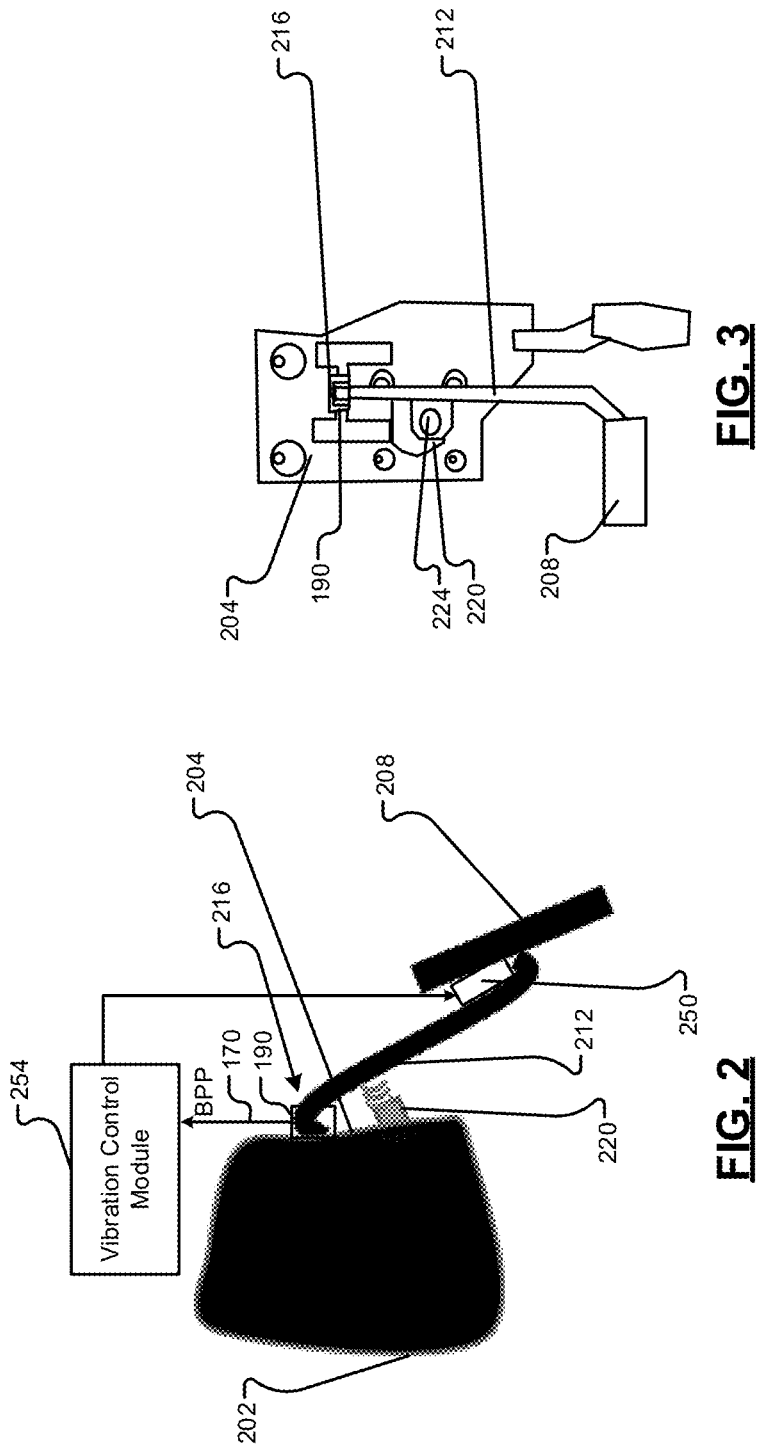

VEHICLE BRAKING TYPE INDICATION SYSTEMS AND METHODS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicles and more particularly to systems and methods for providing non-visual feedback regarding friction braking and regenerative braking.

A vehicle includes a plurality of control modules that control respective actuators of the vehicle. For example, the vehicle may include an engine control module that controls actuators of an internal combustion engine of the vehicle. The vehicle includes a transmission control module that controls actuators of a transmission of the vehicle.

A passenger of a vehicle rides within a passenger cabin (or passenger compartment) of the vehicle. An infotainment system of the vehicle provides various features, such as navigation, mapping, radio, calling, messaging, mobile device connection, and other features. Infotainment systems of vehicles can be referred to as in-vehicle infotainment (IVI) systems and in-vehicle entertainment (IVE) systems. An infotainment system includes a display that displays various infotainment related information. Some infotainment systems include touchscreen displays that also receive user input via user touching.

SUMMARY

In a feature, a feedback system of a vehicle includes: a brake pedal portion configured to be contacted by a driver of the vehicle; an arm portion that is connected to the brake portion and that is configured to, in response to force being applied to the brake pedal portion, move in a first direction away from a first predetermined position and toward a second predetermined position; a detent mechanism configured to: apply a first biasing force to the arm portion in a second direction that is opposite to the first direction when a position of the arm portion is between the first predetermined position and a third predetermined position, where the third predetermined position is between the first and second predetermined positions; and apply a second biasing force to the arm portion in the second direction that is opposite to the first direction when the position of the arm portion is between the third predetermined position and the second predetermined position, where the first biasing force is different than the second biasing force.

In further features, the first biasing force is less than the second biasing force.

In further features, the second biasing force is less than the first biasing force.

In further features, the detent mechanism includes a detent arranged at the third predetermined position.

In further features, a vehicle system includes: the feedback system; a power inverter module configured to control a power control device and charge a battery with power from an electric motor when the position of the arm portion is between the first predetermined position and the third predetermined position; and an electronic brake control module configured to apply pressure to friction brakes of the vehicle when the position of the arm portion is between the third predetermined position and the second predetermined position.

In further features, the power inverter module is configured to control the power control device and increase a rate of charging of the battery with power from the electric motor as the position of the arm portion approaches the third predetermined position.

In further features, the electronic brake control module is configured to increase the pressure applied to the friction brakes as the position of the arm portion approaches the second predetermined position.

In further features, a brake pedal position sensor is configured to measure the position of the arm portion; and a sound control module is configured to: output a first predetermined sound via a speaker when the position is between the first predetermined position and the third predetermined position; and output a second predetermined sound via the speaker when the position is between the third predetermined position and the second predetermined position, where the second predetermined sound is different than the first predetermined sound.

In further features, the sound control module is configured to adjust a characteristic of the second predetermined sound as the position approaches the second predetermined position.

In further features, the sound control module is configured to adjust a characteristic of the first predetermined sound as the position approaches the third predetermined position.

In further features: a brake pedal position sensor is configured to measure the position of the arm portion; and a vibration control module is configured to: vibrate a vibrator according to a first predetermined vibration profile when the position is between the first predetermined position and the third predetermined position; and vibrate the vibrator according to a second predetermined vibration profile when the position is between the third predetermined position and the second predetermined position, where the second predetermined vibration profile is different than the first predetermined vibration profile.

In further features, the vibration control module is configured to adjust a characteristic of the second predetermined vibration profile as the position approaches the second predetermined position.

In further features, the vibration control module is configured to adjust a characteristic of the first predetermined vibration profile as the position approaches the third predetermined position.

In further features, the vibrator is configured to vibrate one of: the brake pedal portion; a driver's seat of the vehicle; and a steering wheel of the vehicle.

In a feature, a feedback system of a vehicle includes: a brake pedal portion configured to be contacted by a driver of the vehicle; an arm portion that is connected to the brake portion and that is configured to, in response to force being applied to the brake pedal portion, move in a first direction away from a first predetermined position and toward a second predetermined position; a brake pedal position sensor configured to measure a position of the arm portion; and a vibration control module configured to: vibrate a vibrator according to a first predetermined vibration profile when the position is between the first predetermined position and a third predetermined position, where the third predetermined position is between the first and second predetermined positions; and vibrate the vibrator according to a second predetermined vibration profile when the position is between the third predetermined position and the second predetermined position, where the second predetermined vibration profile is different than the first predetermined vibration profile.

In further features, the vibration control module is configured to adjust a characteristic of the second predetermined vibration profile as the position approaches the second predetermined position.

In further features, the vibration control module is configured to adjust a characteristic of the first predetermined vibration profile as the position approaches the third predetermined position.

In a feature, a feedback system for a vehicle includes: a brake pedal portion configured to be contacted by a driver of the vehicle; an arm portion that is connected to the brake portion and that is configured to, in response to force being applied to the brake pedal portion, move in a first direction away from a first predetermined position and toward a second predetermined position; a brake pedal position sensor configured to measure a position of the arm portion; and a sound control module configured to: output a first predetermined sound via a speaker when the position is between the first predetermined position and a third predetermined position, where the third predetermined position is between the first and second predetermined positions; and output a second predetermined sound via the speaker when the position is between the third predetermined position and the second predetermined position, where the second predetermined sound is different than the first predetermined sound.

In further features, the sound control module is configured to adjust a characteristic of the second predetermined sound as the position approaches the second predetermined position.

In further features, the sound control module is configured to adjust a characteristic of the first predetermined sound as the position approaches the third predetermined position.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 2 includes a side view including a brake pedal;

FIG. 3 includes a front view including the brake pedal;

In the drawings, reference numbers may be reused to identify similar and/or identical elements.

DETAILED DESCRIPTION

Under some circumstances, such as when an accelerator pedal is actuated away from its predetermined resting position, an inverter may apply power from a battery of a vehicle to an electric motor for vehicle propulsion. Under other circumstances, such as when a brake pedal is actuated away from its predetermined resting position, the inverter performs regeneration (or regenerative braking) and converts kinetic energy of the vehicle into electrical energy and recharges the battery with the electrical energy. A brake control module may additionally or alternatively apply friction brakes of the vehicle when the brake pedal is actuated away from its predetermined resting position.

A driver of the vehicle may adjust driving, for example, to maximize regenerative braking and minimize friction braking. This may maximize a range of the vehicle and minimize wear of the friction brakes of the vehicle.

The present application involves providing the driver with non-visual feedback regarding the braking being performed. For example, a detent mechanism may provide a first resistance to actuation of the brake pedal when the brake pedal is within a first range of positions where the inverter performs regeneration. The detent mechanism may provide a second resistance (e.g., greater than the first resistance) to actuation of the brake pedal when the brake pedal is within a second range of positions where friction braking is performed. In this example, the resistance of the detent mechanism provides non-visual feedback regarding the braking being performed.

Additionally or alternatively to the detent mechanism, one or more other types of non-visual feedback may be provided. For example, a sound control module may output a first sound via a speaker when the brake pedal is within the first range of positions and output a second sound that is different than the first sound via the speaker when the brake pedal is within the second range of positions. As another example, a vibration control module may vibrate a vibrator at a first vibration profile when the brake pedal is within the first range of positions and vibrate the vibrator at a second vibration profile that is different than the first vibration profile when the brake pedal is within the second range of positions. In this examples, the sound and/or vibration provides non-visual feedback regarding the braking being performed.

Figure 1:
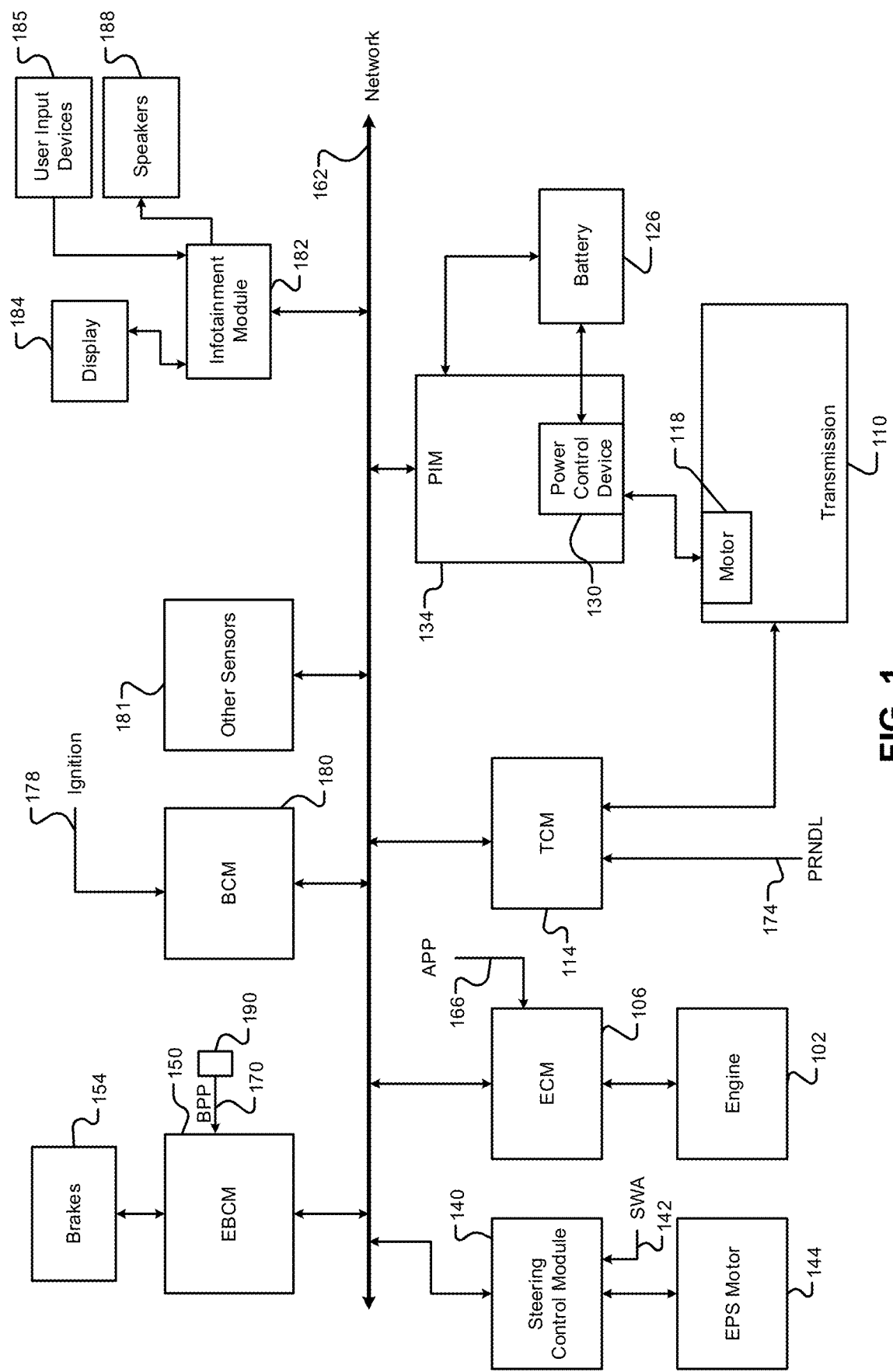
FIG. 1 is a functional block diagram of an example vehicle system.

Referring now to FIG. 1, a functional block diagram of an example vehicle system is presented. While a vehicle system for a hybrid vehicle is shown and will be described, the present disclosure is also applicable to non-hybrid vehicles, electric vehicles, fuel cell vehicles, autonomous vehicles, semi-autonomous vehicles, non-autonomous vehicles, and other types of vehicles.

An engine 102 combusts an air/fuel mixture to generate drive torque. An engine control module (ECM) 106 controls the engine 102 based on a torque request, such as a torque request determined based on one or more driver inputs. For example, the ECM 106 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators.

The engine 102 may output torque to a transmission 110. A transmission control module (TCM) 114 controls operation of the transmission 110. For example, the TCM 114 may control gear selection within the transmission 110 and one or more torque transfer devices (e.g., a torque converter, one or more clutches, etc.).

The vehicle system may include one or more electric motors. For example, an electric motor 118 may be implemented within the transmission 110 as shown in the example of FIG. 1. The electric motor 118 can act as either a generator at some times or as a motor at other times. When acting as a generator, the electric motor 118 converts mechanical energy into electrical energy. The electrical energy can be, for example, used to charge a battery 126 via a power control device (PCD) 130 (e.g., including an inverter). When acting as a motor, the electric motor 118 outputs positive torque that may be used, for example, to supplement or replace torque output by the engine 102. While the example of one electric motor is provided, the vehicle may include more than one electric motor. Regeneration occurs when the electric motor 118 is converting mechanical energy into electrical energy. Regeneration slows (brakes) the vehicle.

A power inverter control module (PIM) 134 controls the PCD 130 to control power flow to and from the electric motor 118. At some times, the PIM 134 controls the PCD 130 to convert direct current (DC) power from the battery 126 into alternating current (AC) power and apply the AC power to the electric motor 118. The electric motor 118 outputs positive torque when power is applied to the electric motor 118. At other times, the PIM 134 controls the PCD 130 also converts AC power generated by the electric motor 118 into DC power and provides the DC power, for example, to the battery 126. The electric motor 118 outputs negative torque (and decelerates the vehicle) when the electric motor 118 is outputting power. The PIM 134 may be referred to as a power inverter module (PIM) in various implementations.

A steering control module 140 controls steering/turning of wheels of the vehicle, for example, based on driver turning of a steering wheel within the vehicle and/or steering commands from one or more vehicle modules. A steering wheel angle sensor (SWA) monitors rotational position of the steering wheel and generates a SWA 142 based on the position of the steering wheel. As an example, the steering control module 140 may control vehicle steering via an electronic power steering (EPS) motor 144 based on the SWA 142. However, the vehicle may include another type of steering system. An electronic brake control module (EBCM) 150 selectively controls application of friction brakes 154 of the vehicle.

Modules of the vehicle may share parameters via a network 162, such as a controller area network (CAN). In vehicles, CAN may also stand for car area network. The network 162 may include one or more data buses. Various parameters may be made available by a given control module to other control modules via the network 162.

The driver inputs may include, for example, an accelerator pedal position (APP) 166, which may be provided to the ECM 106. A brake pedal position (BPP) 170 may be provided to the EBCM 150. A position 174 of a range selector, such as a park, reverse, neutral, drive lever (PRNDL), may be provided to the TCM 114. An ignition state 178 may be provided to a body control module (BCM) 180. For example, the ignition state 178 may be input by a driver via an ignition key, button, or switch. At a given time, the ignition state 178 may be one of off, accessory, run, or crank.

The vehicle may also include one or more other sensors 181. Examples of the other sensors 181 include, for example, one or more laser imaging distancing and ranging (LIDAR) sensors, one or more radar sensors, one or more cameras, and one or more sonar sensors. One or more control modules may control respective devices based on input from one or more of the one or more other sensors 181. For example, based on input from one or more of the one or more other sensors 181, the ECM 106 may control the engine 102, the PIM 134 may control the PCD 130, the steering control module 140 may control the EPS motor 144, and/or the EBCM 150 may control the friction brakes 154.

The vehicle system may include an infotainment module 182. The infotainment module 182 controls what is displayed on a display 184. The display 184 may be a touchscreen display in various implementations and transmit signals indicative of user input to the display 184 to the infotainment module 182. The Infotainment module 182 may additionally or alternatively receive signals indicative of user input from one or more other user input devices 185, such as one or more switches, buttons, knobs, etc.

The infotainment module 182 also generates output via one or more other devices. For example, the infotainment module 182 may output sound via one or more speakers 188 of the vehicle. The vehicle may include one or more additional control modules that are not shown, such as a chassis control module, a battery pack control module, etc. The vehicle may omit one or more of the control modules shown and discussed.

The BPP 170 is measured using a BPP sensor 190. Vehicle braking can be performed using the friction brakes 154, regeneration via the electric motor 118, or a combination of friction braking (using the friction brakes 154) and regeneration (using the electric motor 118).

Based on the BPP 170, the EBCM 150 and the PIM 134 control friction braking and regenerative braking, respectively. The BPP 170 may be limited to a range defined by a first predetermined position (e.g., 0 percent) when no pressure is being applied to the brake pedal and a second predetermined position (e.g., 100 percent) when the brake pedal is actuated to a greatest possible extent.

When the BPP 170 is between the first predetermined position and a third predetermined position (that is greater than the first predetermined position and less than the second predetermined position), the PIM 134 may control the PCD 130 to perform regenerative braking when a state of charge (SOC) of the battery 126 is less than a predetermined SOC. For example, the PIM 134 may control the PCD 130 to increase the amount of regenerative braking performed as the BPP 170 increases toward the third predetermined position, and vice versa. The third predetermined position may be, for example, approximately 25% or another suitable position between the first and second predetermined positions.

The PIM 134 may control the PCD 130 to perform a predetermined maximum amount of regenerative braking when the BPP 170 is at least the third predetermined position. The EBCM 150 may minimize or perform no friction braking (i.e., not apply the friction brakes 154) when the BPP 170 is less than the third predetermined position. In various implementations, the third predetermined position may be variable and may be set (e.g., by the PIM 134) based on the SOC of the battery 126. For example, the PIM 134 may decrease the third predetermined position as the SOC of the battery 126 increases and vice versa. In various implementations, the third predetermined position may be a fixed predetermined position.

When the BPP 170 is between the third predetermined position and the second predetermined position, the EBCM 150 actuates the friction brakes 154 to perform friction braking. The EBCM 150 may increase the amount of friction braking performed (i.e., increase a hydraulic pressure applied to the friction brakes 154) as the BPP 170 increases toward the second predetermined position, and vice versa. The PIM 134 may control the PCD 130 to perform zero, some, or the predetermined maximum amount of regenerative braking while the BPP 170 is between the third predetermined value and the second predetermined value. The PIM 134 may determine an amount of regenerative braking to perform, for example, based on at least one of the BPP 170 and the SOC of the battery 126.

Drivers of electric vehicles (EVs) and hybrid electric vehicles (HEVs) may use feedback regarding the amount of energy being recovered (via regenerative braking) and the amount of energy being lost (via friction braking). For example, based on this feedback, drivers may adjust their vehicle driving to maximize energy recovery, minimize energy loss, and/or maximize vehicle range.

The present application involves providing non-visual feedback indicative of the present amount of energy being recovered via regeneration and/or the present amount of energy being lost via friction braking. As an example, a device (e.g., a detent mechanism) may control resistance (biasing force) of the brake pedal based on the position of the brake pedal. The device may be configured to provide a first resistance when the BPP 170 is between the first and third predetermined positions and to provide a second resistance that is different (e.g., greater) than the first resistance when the BPP 170 is between the third and second predetermined positions. Additionally or alternatively, the infotainment module 182 may output a first predetermined sound when the BPP 170 is between the first and third predetermined positions. The infotainment module 182 may output a second predetermined sound that is different than the first predetermined sound when the BPP 170 is between the third and second predetermined positions. Additionally or alternatively to the resistance or outputting of sound, a vibration control module (discussed further below) may vibrate a vibrator that vibrates the brake pedal based on a first predetermined vibration profile when the BPP 170 is between the first and third predetermined positions. The vibration control module may vibrate the vibrator based on a second predetermined vibration profile that is different than the first predetermined vibration profile when the BPP 170 is between the third and second predetermined positions. The resistance, sound, and/or vibration provides non-visual feedback to the driver indicative of the amount of regenerative braking being performed and the amount of friction braking being performed.

FIG. 2 includes a side view of an example brake pedal assembly. FIG. 3 includes a front view of the example brake pedal assembly. The brake pedal assembly may include a mounting plate 204 configured to secure the brake pedal assembly to a firewall of the vehicle or another suitable structure 202 of the vehicle in front of a driver's seat of the vehicle. The mounting plate 204 may be secured, for example, using bolts, screws, and/or one or more other types of fasteners.

The brake pedal assembly includes a brake pedal portion 208 and a brake arm portion 212. The brake pedal portion 208 is connected to the brake arm portion 212. The driver applies the brake pedal portion 208 to request performance of braking (regenerative and/or friction). The brake arm portion 212 is coupled to a hinge 216 that is coupled to the mounting plate 204. Application of pressure to the brake pedal portion 208 causes the brake arm portion 212 to move angularly via the hinge 216. The brake pedal assembly includes a biasing device that biases the brake arm portion 212 toward the first predetermined position. For example, the hinge 216 may include one or more springs that bias the brake arm portion 212 toward the first predetermined position.

The BPP sensor 190 may measure the BPP 170 based on a position of the brake arm portion 212. The BPP sensor 190 may include, for example, a potentiometer that varies its output according to the position of the brake arm portion 212 or another type of BPP sensor. The BPP sensor 190 may be located at or near the hinge 216.

The brake pedal assembly may also include a detent mechanism 220. The detent mechanism 220 is configured to apply a first biasing force away from the firewall (opposing force applied by the driver) when the BPP 170 is between the first predetermined position and the third predetermined position. The detent mechanism 220 is configured to apply a second biasing force away from the firewall (opposing force applied by the driver) when the BPP is between the third predetermined position and the second predetermined position. The first biasing force is different than the second biasing force. For example, the first biasing force may be less than the second biasing force. In this way, the driver may experience a lesser resistance from the brake pedal portion 208 when the BPP 170 is between the first and third predetermined positions (when regenerative braking is performed) than when the BPP 170 is between the third and second predetermined positions (when friction braking is performed). As another example, the first biasing force may be greater than the second biasing force.

The detent mechanism 220 may include a detent at the third predetermined position such that a click or another type of tactile feedback can be felt via the brake pedal portion 208 when the BPP 170 reaches the third predetermined position. In various implementations, such as shown in FIG. 3, the brake arm portion 212 may include a tab 224 that extends outwardly from the brake arm portion 212. The detent mechanism 220 may receive and apply force via the tab 224.

In various implementations, a vibrator 250 may be included. As shown in FIG. 2, the vibrator 250 may vibrate the brake pedal portion 208. While the example of the vibrator 250 is provided in association with the brake pedal portion 208, the vibrator 250 may instead vibrate a steering wheel or the driver's seat or be located in another suitable location where vibration of the vibrator 250 can be felt by the driver. Also, while the example of one vibrator is provided, the present application is also applicable to more than one vibrator.

A vibration control module 254 controls vibration of the vibrator 250 based on the BPP 170. For example, the vibration control module 254 may not vibrate the vibrator 250 when the BPP 170 is in the first predetermined position. When the BPP 170 is between the first predetermined position and the third predetermined position, the vibration control module 254 vibrates the vibrator 250 at a first predetermined vibration profile. When the BPP 170 is between the third predetermined position and the second predetermined position, the vibration control module 254 vibrates the vibrator 250 at a second predetermined vibration profile. The first predetermined vibration profile is different than the second predetermined vibration profile. In this way, the driver experiences different vibration during regenerative braking (without friction braking) than when friction braking (with or without regenerative braking) is performed. The first and second vibration profiles each include one or more vibration amplitudes to apply and one or more frequencies, respectively.

In various implementations, the vibration control module 254 may adjust one or more characteristics of the first predetermined vibration profile as the BPP 170 increases toward the third predetermined position. For example, the vibration control module 254 may multiply the vibration amplitudes of the first predetermined vibration profile by a first gain value (greater than or equal to 1) and increase the first gain value as the BPP 170 increases toward the third predetermined position. The vibration control module 254 may decrease the first gain value toward 1.0 as the BPP 170 decreases toward the first predetermined position. This may provide the driver with non-visual feedback regarding the magnitude of the regenerative braking being performed.

The vibration control module 254 may also adjust one or more characteristics of the second predetermined vibration profile as the BPP 170 increases above the third predetermined positon toward the second predetermined position. For example, the vibration control module 254 may multiply the vibration amplitudes of the second predetermined vibration profile by a second gain value (greater than or equal to 1) and increase the second gain value as the BPP 170 increases toward the second predetermined position. The vibration control module 254 may decrease the second gain value toward 1.0 as the BPP 170 decreases toward the third predetermined position. This may provide the driver with non-visual feedback regarding the magnitude of the friction braking being performed.

Referring back to FIG. 1, the infotainment module 182 may control sound output by the speakers 188 based on the BPP 170. For example, the infotainment module 182 may not output braking sound when the BPP 170 is in the first predetermined position. When the BPP 170 is between the first predetermined position and the third predetermined position, the infotainment module 182 outputs a first predetermined braking sound via the speakers 188. When the BPP 170 is between the third predetermined position and the second predetermined position, the infotainment module 182 outputs at a second predetermined braking sound via the speakers 188. The first predetermined braking sound is different than the second predetermined braking sound. In this way, the driver experiences different sound during regenerative braking (without friction braking) than when friction braking (with or without regenerative braking) is performed. The first and second predetermined braking sounds each include one or more amplitudes of sound to output at one or more frequencies, respectively.

In various implementations, the infotainment module 182 may adjust one or more characteristics of the first predetermined braking sound as the BPP 170 increases toward the third predetermined position. For example, the infotainment module 182 may multiply the amplitudes of the first predetermined sound by a first sound gain value (greater than or equal to 1) and increase the first sound gain value as the BPP 170 increases toward the third predetermined position. The infotainment module 182 may decrease the first sound gain value toward 1.0 as the BPP 170 decreases toward the first predetermined position. This may provide the driver with non-visual feedback regarding the magnitude of the regenerative braking being performed.

The infotainment module 182 may also adjust one or more characteristics of the second predetermined braking sound as the BPP 170 increases above the third predetermined position toward the second predetermined position. For example, the infotainment module 182 may multiply the amplitudes of the second predetermined braking sound by a second sound gain value (greater than or equal to 1) and increase the second sound gain value as the BPP 170 increases toward the second predetermined position. The infotainment module 182 may decrease the second sound gain value toward 1.0 as the BPP 170 decreases toward the third predetermined position. This may provide the driver with non-visual feedback regarding the magnitude of the friction braking being performed.

Figure 4:
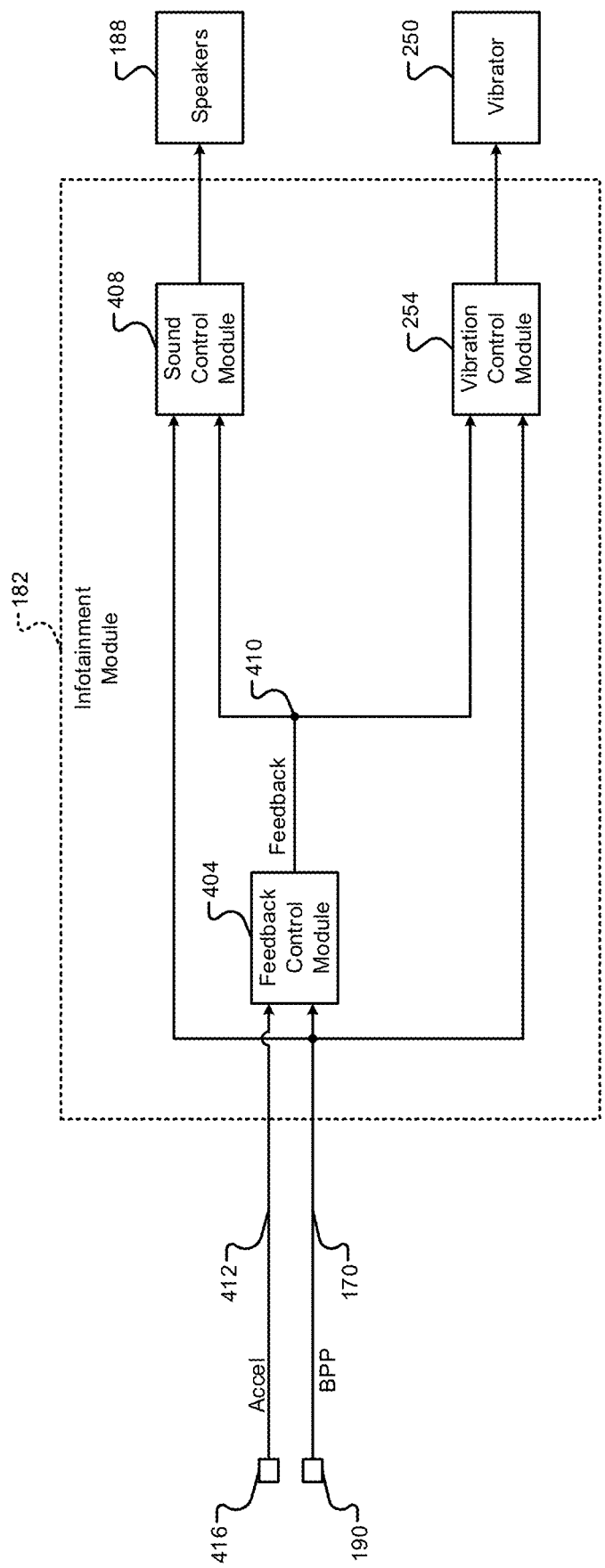
FIG. 4 includes a functional block diagram of a feedback system including an infotainment module.

FIG. 4 includes a functional block diagram of a feedback system including the infotainment module 182. The infotainment module 182 may include the vibration control module 254, a feedback module 404, and a sound control module 408. While the example of the vibration control module 254 and the feedback module 404 being implemented in the infotainment module 182 is provided, the vibration control module 254 and/or the feedback module 404 may be implemented independently or within another suitable module.

The feedback module 404 generates a feedback signal 410 that indications whether to provide non-visual feedback regarding vehicle braking. For example only, the feedback module 404 may set the feedback signal 410 to a first state when a longitudinal acceleration 412 of the vehicle is negative (i.e., less than zero). The longitudinal acceleration 412 is negative during deceleration of the vehicle. The feedback module 404 may set the feedback signal 410 to a second state when the longitudinal acceleration 412 is zero or positive. A longitudinal acceleration sensor 416 may measure the longitudinal acceleration 412 of the vehicle.

The feedback module 404 may additionally or alternatively set the feedback signal 410 based on the BPP 170. For example, the feedback module 404 may set the feedback signal 410 to the first state when the BPP is greater than the first predetermined position. The feedback module 404 may set the feedback signal 410 to the second state when the BPP 170 is equal to the first predetermined position.

The sound control module 408 outputs the first predetermined braking sound or the second predetermined braking sound, as discussed above, when the feedback signal 410 is in the first state. The sound control module 408 may or may not output braking sound when the feedback signal is in the second state. For example, the sound control module 408 may not output sound when the feedback signal is in the second state and the vehicle is accelerating. The sound control module 408 may output braking sound when the feedback signal is in the second state and the vehicle is decelerating.

Additionally or alternatively to outputting sound, the vibration control module 254 vibrates the vibrator 250 at the first predetermined vibration profile or the second predetermined vibration profile, as discussed above, when the feedback signal 410 is in the first state. The vibration control module 254 may not vibrate the vibrator 250 for vehicle braking when the feedback signal is in the second state.

Figure 5:
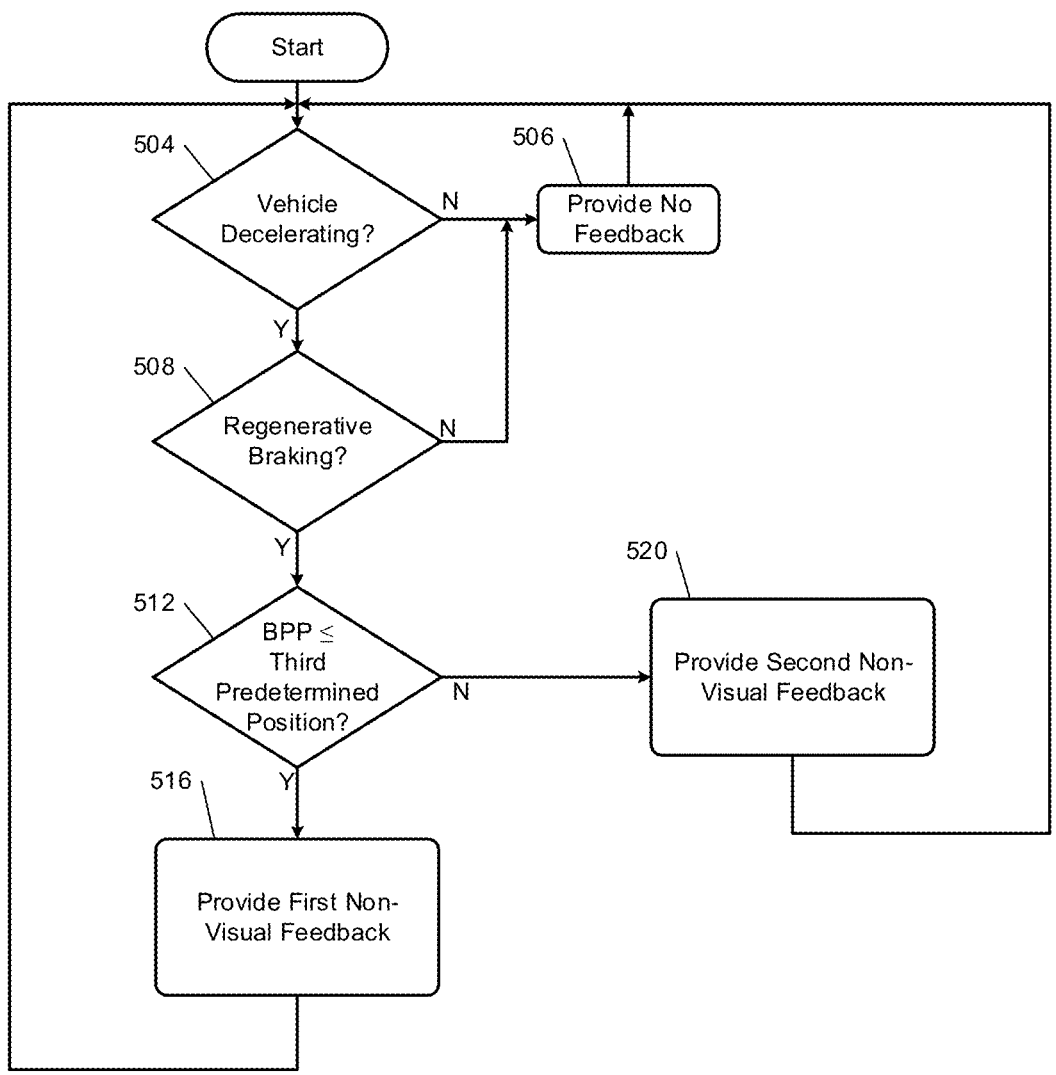
FIG. 5 includes a flowchart depicting an example method of providing non-visual feedback regarding vehicle braking.

FIG. 5 includes a flowchart depicting an example method of providing non-visual feedback regarding vehicle braking. Control may begin with 504 where the feedback module 404 determines whether the vehicle is decelerating. For example, the feedback module 404 may determine whether the longitudinal acceleration 412 is negative. Additionally or alternatively, the feedback module 404 may determine whether the BPP 170 is greater than the first predetermined position. If 504 is true, control continues with 508. If 504 is false, no feedback is provided to the driver regarding braking at 506, and control returns to 504. For example, no resistance is exerted on the driver's foot via the detent mechanism 220, the sound control module 408 does not output the first or second predetermined braking sound, and the vibration control module 254 does not vibrate the vibrator 250.

At 508, the sound control module 408 and/or the vibration control module 254 may determine whether regenerative braking is being performed. For example, the PIM 134 may output a signal indicative of whether regenerative braking is being performed. The PIM 134 may also indicate a magnitude of the amount of regenerative braking being performed. The magnitude may increase as a rate of charging of the battery 126 increases and vice versa. If 508 is true, control may continue with 512. If 508 is false, control may continue with 506, as described above. If friction braking is being used, the sound control module 408 and/or the vibration control module 254 sound according to the second predetermined sound or vibrate the vibrator 250 the second predetermined vibration profile.

At 512, the sound control module 408 and/or the vibration control module 254 determine whether the BPP 170 is less than or equal to the third predetermined position. If 512 is true, control continues with 516. If 512 is false, control transfers to 520.

At 516, control outputs first non-visual feedback regarding the vehicle braking. For example, the sound control module 408 outputs the first predetermined braking sound via the speakers 188. The sound control module 408 may adjust the first predetermined braking sound based on the first sound gain value and set the first sound gain value based on the BPP 170. The first predetermined braking sound may be, for example, more aurally pleasing to indicate that energy is being recovered via regenerative braking. Additionally or alternatively, the vibration control module 254 may vibrate the vibrator 250 at the first predetermined vibration profile. The vibration control module 254 may adjust the first predetermined vibration profile based on the first gain value and set the first gain value based on the BPP 170. As discussed above, the detent mechanism 220 provides the first resistance at the brake pedal when the BPP 170 is less than or equal to the third predetermined position. The detent mechanism 220 may also include a detent at the third predetermined position to provide tactile feedback.

At 520, control outputs second non-visual feedback regarding the vehicle braking. For example, the sound control module 408 outputs the second predetermined braking sound via the speakers 188. The second predetermined braking sound may be, for example, less aurally pleasing to indicate that more energy is being lost via friction braking. The sound control module 408 may adjust the second predetermined braking sound based on the second sound gain value and set the second sound gain value based on the BPP 170. Additionally or alternatively, the vibration control module 254 may vibrate the vibrator 250 at the second predetermined vibration profile. The vibration control module 254 may adjust the second predetermined vibration profile based on the second gain value and set the second gain value based on the BPP 170. As discussed above, the detent mechanism 220 provides the second resistance at the brake pedal when the BPP 170 is greater than or equal to the third predetermined position. When both regenerative and friction braking are being performed (e.g., within a predetermined BPP range around the third predetermined position), the sound control module 408 may blend the first and second predetermined sounds or output a third predetermined braking sound via the speakers 188. Additionally or alternatively, when both regenerative and friction braking are being performed (e.g., within the predetermined BPP range around the third predetermined position), the vibration control module 254 may vibrate the vibrator 250 by blending the first and second predetermined profiles or at a third predetermined vibration profile.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A feedback system for a vehicle, comprising:
   a brake pedal portion configured to be contacted by a driver of the vehicle;
   an arm portion that is connected to the brake portion and that is configured to, in response to force being applied to the brake pedal portion, move in a first direction away from a first predetermined position and toward a second predetermined position;
   a detent mechanism configured to:
      apply a first biasing force to the arm portion in a second direction that is opposite to the first direction when a position of the arm portion is between the first predetermined position and a third predetermined position,
      wherein the third predetermined position is between the first and second predetermined positions; and
      apply a second biasing force to the arm portion in the second direction that is opposite to the first direction when the position of the arm portion is between the third predetermined position and the second predetermined position,
   wherein the first biasing force is different than the second biasing force, and
   wherein the detent mechanism includes a detent arranged at the third predetermined position, the detent configured to output tactile feedback that can be felt via the brake pedal portion when the position of the arm portion is at the third predetermined position.

2. The feedback system of claim 1 wherein the first biasing force is less than the second biasing force.

3. The feedback system of claim 1 wherein the second biasing force is less than the first biasing force.

4. A vehicle system comprising:
   the feedback system of claim 1;
   a power inverter module configured to control a power control device and charge a battery with power from an electric motor when the position of the arm portion is between the first predetermined position and the third predetermined position; and
   an electronic brake control module configured to apply pressure to friction brakes of the vehicle when the position of the arm portion is between the third predetermined position and the second predetermined position.

5. The vehicle system of claim 4 wherein the power inverter module is configured to control the power control device and increase a rate of charging of the battery with power from the electric motor as the position of the arm portion approaches the third predetermined position.

6. The vehicle system of claim 4 wherein the electronic brake control module is configured to increase the pressure applied to the friction brakes as the position of the arm portion approaches the second predetermined position.

7. The feedback system of claim 1 further comprising:
   a brake pedal position sensor configured to measure the position of the arm portion; and
   a sound control module configured to:
      output a first predetermined sound via a speaker when the position of the arm portion is between the first predetermined position and the third predetermined position; and
      output a second predetermined sound via the speaker when the position of the arm portion is between the third predetermined position and the second predetermined position,
   wherein the second predetermined sound is different than the first predetermined sound.

8. The feedback system of claim 7 wherein the sound control module is configured to adjust a characteristic of the second predetermined sound as the position of the arm portion approaches the second predetermined position.

9. The feedback system of claim 7 wherein the sound control module is configured to adjust a characteristic of the first predetermined sound as the position of the arm portion approaches the third predetermined position.

10. The feedback system of claim 1 further comprising:
a brake pedal position sensor configured to measure the position of the arm portion; and
a vibration control module configured to:
vibrate a vibrator according to a first predetermined vibration profile when the position of the arm portion is between the first predetermined position and the third predetermined position; and
vibrate the vibrator according to a second predetermined vibration profile when the position of the arm portion is between the third predetermined position and the second predetermined position,
wherein the second predetermined vibration profile is different than the first predetermined vibration profile.

11. The feedback system of claim 10 wherein the vibration control module is configured to adjust a characteristic of the second predetermined vibration profile as the position of the arm portion approaches the second predetermined position.

12. The feedback system of claim 10 wherein the vibration control module is configured to adjust a characteristic of the first predetermined vibration profile as the position of the arm portion approaches the third predetermined position.

13. The feedback system of claim 10 further comprising the vibrator, wherein the vibrator is configured to vibrate one of:
the brake pedal portion;
a driver's seat of the vehicle; and
a steering wheel of the vehicle.

14. A feedback system for a vehicle, comprising:
a brake pedal portion configured to be contacted by a driver of the vehicle;
an arm portion that is connected to the brake portion and that is configured to, in response to force being applied to the brake pedal portion, move in a first direction away from a first predetermined position and toward a second predetermined position;
a brake pedal position sensor configured to measure a position of the arm portion;
a vibration control module configured to:
vibrate a vibrator according to a first predetermined vibration profile when the position of the arm portion is between the first predetermined position and a third predetermined position,
wherein the third predetermined position is between the first and second predetermined positions; and
vibrate the vibrator according to a second predetermined vibration profile when the position of the arm portion is between the third predetermined position and the second predetermined position,
wherein the second predetermined vibration profile is different than the first predetermined vibration profile; and
a detent configured to output tactile feedback that can be felt via the brake pedal portion when the position of the arm portion is at the third predetermined position.

15. The feedback system of claim 14 wherein the vibration control module is configured to adjust a characteristic of the second predetermined vibration profile as the position approaches the second predetermined position.

16. The feedback system of claim 14 wherein the vibration control module is configured to adjust a characteristic of the first predetermined vibration profile as the position approaches the third predetermined position.

17. A feedback system for a vehicle, comprising:
a brake pedal portion configured to be contacted by a driver of the vehicle;
an arm portion that is connected to the brake portion and that is configured to, in response to force being applied to the brake pedal portion, move in a first direction away from a first predetermined position and toward a second predetermined position;
a brake pedal position sensor configured to measure a position of the arm portion;
a sound control module configured to:
output a first predetermined sound via a speaker when the position of the arm portion is between the first predetermined position and a third predetermined position,
wherein the third predetermined position is between the first and second predetermined positions; and
output a second predetermined sound via the speaker when the position of the arm portion is between the third predetermined position and the second predetermined position,
wherein the second predetermined sound is different than the first predetermined sound; and
a detent configured to output tactile feedback that can be felt via the brake pedal portion when the position of the arm portion is at the third predetermined position.

18. The feedback system of claim 17 wherein the sound control module is configured to adjust a characteristic of the second predetermined sound as the position approaches the second predetermined position.

19. The feedback system of claim 17 wherein the sound control module is configured to adjust a characteristic of the first predetermined sound as the position approaches the third predetermined position.

* * * * *